(12) United States Patent
Cassone et al.

(10) Patent No.: US 8,108,238 B1
(45) Date of Patent: Jan. 31, 2012

(54) FLEXIBLE PROJECT GOVERNANCE BASED ON PREDICTIVE ANALYSIS

(75) Inventors: Deandra T. Cassone, Overland Park, KS (US); Paul R. Sapenaro, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1236 days.

(21) Appl. No.: 11/742,994

(22) Filed: May 1, 2007

(51) Int. Cl.
*G06Q 10/00* (2006.01)
(52) U.S. Cl. .............. 705/7.13; 705/7.11; 705/7.12; 705/7.22; 705/7.23
(58) Field of Classification Search ........ 705/7.11–7.13, 705/7.22, 7.23
See application file for complete search history.

(56) References Cited

U.S. PATENT DOCUMENTS

| | | | | |
|---|---|---|---|---|
| 5,548,506 | A * | 8/1996 | Srinivasan | 705/7.15 |
| 6,256,773 | B1 * | 7/2001 | Bowman-Amuah | 717/121 |
| 6,658,643 | B1 * | 12/2003 | Bera | 717/101 |
| 6,895,382 | B1 * | 5/2005 | Srinivasan et al. | 705/7.17 |
| 7,117,161 | B2 * | 10/2006 | Bruce | 705/7.26 |
| 7,139,999 | B2 * | 11/2006 | Bowman-Amuah | 717/101 |
| 7,337,124 | B2 * | 2/2008 | Corral | 705/7.17 |
| 7,359,865 | B1 * | 4/2008 | Connor et al. | 705/7.28 |
| 7,559,049 | B1 * | 7/2009 | Hemmat et al. | 717/102 |
| 7,617,117 | B2 * | 11/2009 | Starkey | 705/7.22 |
| 7,743,369 | B1 * | 6/2010 | Srinivasan et al. | 717/155 |
| 7,747,572 | B2 * | 6/2010 | Scott et al. | 707/636 |
| 7,873,531 | B2 * | 1/2011 | Starkey | 705/7.23 |
| 7,983,946 | B1 | 7/2011 | Cassone et al. | |
| 2001/0032105 | A1 * | 10/2001 | Frye et al. | 705/7 |
| 2001/0051913 | A1 * | 12/2001 | Vashistha et al. | 705/37 |
| 2002/0042731 | A1 * | 4/2002 | King et al. | 705/10 |
| 2002/0059512 | A1 * | 5/2002 | Desjardins | 713/1 |
| 2002/0147620 | A1 * | 10/2002 | Walsh | 705/7 |
| 2002/0198926 | A1 * | 12/2002 | Panter et al. | 709/106 |
| 2003/0033191 | A1 * | 2/2003 | Davies et al. | 705/10 |
| 2003/0135399 | A1 * | 7/2003 | Ahamparam et al. | 705/7 |
| 2004/0030992 | A1 * | 2/2004 | Moisa et al. | 715/513 |
| 2004/0054565 | A1 * | 3/2004 | Nemecek et al. | 705/7 |
| 2004/0098154 | A1 * | 5/2004 | McCarthy | 700/97 |
| 2004/0098300 | A1 * | 5/2004 | Karwatowski et al. | 705/11 |
| 2004/0143811 | A1 * | 7/2004 | Kaelicke et al. | 717/101 |
| 2004/0186757 | A1 * | 9/2004 | Starkey | 705/7 |
| 2004/0243968 | A1 * | 12/2004 | Hecksel | 717/100 |
| 2004/0255265 | A1 * | 12/2004 | Brown et al. | 717/101 |
| 2005/0021348 | A1 * | 1/2005 | Chan et al. | 705/1 |
| 2005/0027386 | A1 * | 2/2005 | Weigand et al. | 700/97 |
| 2005/0027578 | A1 * | 2/2005 | Chambers et al. | 705/8 |
| 2005/0114829 | A1 * | 5/2005 | Robin et al. | 717/101 |
| 2005/0144592 | A1 * | 6/2005 | Below et al. | 717/124 |
| 2006/0026009 | A1 * | 2/2006 | Luhr | 705/1 |

(Continued)

OTHER PUBLICATIONS

Olson, D.L., "Comparison of Weights in Topsis Models" Mathematical and Computer Modelling 0 (2004) 1-0 2004 Elsevier Science Ltd.*

(Continued)

*Primary Examiner* — Lynda Jasmin
*Assistant Examiner* — Alan S Miller (57) ABSTRACT

A computer implemented method is provided for flexible project governance based on predictive analysis. Project complexity factors are analyzed to determine a project complexity index. Initial development gates are selected for a project based on the project complexity index. Project governance factors are periodically analyzed to determine a project governance index. Actions for project reporting and for the initial development gates are selected based on the project governance index.

20 Claims, 5 Drawing Sheets

U.S. PATENT DOCUMENTS

2006/0129439 A1* 6/2006 Arlt et al. .......................... 705/7
2007/0106599 A1* 5/2007 Hochberg et al. ............... 705/38
2008/0082388 A1* 4/2008 Fishman ........................... 705/8

OTHER PUBLICATIONS

Sambasivarao, K.V., et al. "Factors for Evaluating Factory Automation Projects—Inferences from an Indian Survey." Work Study, Jul./Aug. 1995, vol. 44, No. 5, p. 16.*

Ustinovichius, Leonas. "Determination of Efficiency of Investments in Construction." International Journal of Strategic Property Management, vol. 8, No. 1, 2004, p. 25.*

Bottani, Eleonora and Antonio Rizzi. "A Fuzzy TOPSIS Methodology to Support Outsourcing of Logistics Services." Supply Chain Management: An International Journal, 11/4 (2006) 294-308.*

Kahraman, Cengiz, et al. "Hierarchical Fuzzy TOPSIS Model for Selection Among Logistics Information Technologies." Journal of Enterprise Information Management, vol. 20, No. 2, 2007, pp. 143-168.*

Kerzner, Harold, "Project Management: A Systems Approach to Planning, Scheduling, and Controlling" 7th Edition, 2001, John Wiley & Sons, New York, Ny, p. 83.

Berenson, Mark L. et al., "TOPSIS", Section 2.3.5, "Basic Business Statistics: Concepts and Applications" 8th Edition, 2002, Prentice Hall, Upper Saddle River, NJ, pp. 549-633.

Hwang, Ching-Lai, et al., "Multiple Attribute Decision Making: Methods and Applications—A State-of-the-Art Survey", 1981, Springer-Verlag, Berlin; New York, pp. 128-140.

"A Guide to the Project Management Body of Knowledge (PMBOK® Guide)" 3rd Edition, 2004, Project Management Institute, Inc., Newtown Square, PA, pp. 171-178.

* cited by examiner

Fig. 2

Table 200 — Project Complexity

| Project Complexity | Complexity Index (Computed from Complexity Criteria) | Vendors (count) | RFP Required | Alpha/Beta Testing (0 - none, 1 - Alpha, 2 - Alpha and Beta) | Number of Appl IDs (count) | Network Impacts (1 - low to 5 - high) | IT Billing Impacts (1 - low to 5 - high) | CEBU Impacts (1 - low to 5 - high) | New Technology (1 - low to 5 - high) | Project Dependencies (1 - low to 5 - high) | New Business Process (1 - low to 5 - high) | No. Business Areas Impacted (count) | Total Project Cost | Predicted Project Length (weeks) |
|---|---|---|---|---|---|---|---|---|---|---|---|---|---|---|
| Lower Limit | 0 | | 0 | 0 | 0 | 0 | 1 | 1 | 1 | 1 | 1 | 1 | 1 | $100,000 | 1 |
| Very Low | 0.00 - 0.19 | | | | | | | | | | | | | | |
| Low | 0.20 - 0.39 | | | | | | | | | | | | | | |
| Medium | 0.40 - 0.59 | | | | | | | | | | | | | | |
| High | 0.60 - 0.79 | | | | | | | | | | | | | | |
| Very High | 0.80 - 0.99 | | | | | | | | | | | | | | |
| Upper Limit | 1 | | 20 | 20 | 2 | 400 | 5 | 5 | 5 | 5 | 5 | 5 | 20 | $500,000,000 | 200 |

Fig. 3

Table 300 — Project Governance

| Project Governance Classifications | Project Governance Index | Cost Performance Index - CPI | Schedule Performance Index - SPI | Elapsed time in phase (% of total time) | Expended resources in phase (% total resources) | Scope assessment (scope reductions 1 none to 5 significant) | Non-Administrative Change Requests | Team Turnover (% churn) | Sponsor Change (0 - no to 1 - yes) | Constrained Resources (1 - none to 5 - many) |
|---|---|---|---|---|---|---|---|---|---|---|
| Lower Limit | 0.00 | 0.00 | 0.00 | 0.0% | 0.0% | | 1 | 0.0% | 0 | 1 |
| Very Low | 0.00 - 0.19 | | | | | | | | | |
| Low | 0.20 - 0.39 | | | | | | | | | |
| Medium | 0.40 - 0.59 | | | | | | | | | |
| High | 0.60 - 0.79 | | | | | | | | | |
| Very High | 0.80 - 0.99 | | | | | | | | | |
| Upper Limit | 1.00 | 2 | 2 | 200.0% | 500.0% | 5 | 5 | 200.0% | 1 | 5 |

FLEXIBLE PROJECT GOVERNANCE BASED ON PREDICTIVE ANALYSIS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A project development project is a temporary endeavor undertaken to develop a new product or service. An organization may use a project development pipeline to organize and optimize the allocation of resources for a stream of developing projects. Such resources may include time, money, people, materials, energy, space, equipment, communication, quality assurance, and risk tolerance. A project development pipeline consists of a chain of process phases and resources arranged so that the output of each element of the chain flows into the input of the next element in the project development pipeline. Projects in a project development pipeline are governed to various degrees to insure that the project is completed on time and within budget. However, the governance actions that are appropriate for one project may be inappropriate for another project, creating bureaucracy and unnecessary delays.

SUMMARY

In embodiments of the present disclosure, computer implemented methods and computer implemented systems are provided for flexible project governance that employs customized development gate selection based on a predictive analysis. Project complexity factors are analyzed to determine a project complexity index. Initial development gates are selected for a project based on the project complexity index. Project governance factors are periodically analyzed to determine a project governance index. Actions for project reporting and for updating the selection of the initial development gates are determined based on the project governance index.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, in which like reference numerals represent like parts.

DETAILED DESCRIPTION

It should be understood at the outset that although implementations of various embodiments of the present disclosure are described below, the present system may be implemented using any number of techniques, whether currently known or in existence.

The present disclosure should in no way be limited to the implementations, drawings, and techniques described below, but may be modified within the scope of the appended claims along with their full scope of equivalents.

In embodiments of the present disclosure, computer implemented methods and computer implemented systems are provided for flexible project governance based on predictive analysis. Analysis of historical project data can identify factors that determine a project's complexity. A project complexity index is created for a project by analyzing the project's complexity factors. Based on the project complexity index, development gates are selected for the project to achieve the optimal amount of governance. A development gate is a part in a project pipeline where the development during a preceding project phase is evaluated. Some project managers may initially select only a few development gates for a complex project to avoid adding further requirements to a project development process that is likely to have many delays during a long development time. In contrast, embodiments of the present disclosure can select many development gates to insure that a complex project is governed frequently to avoid problems such as delays. If the project's complexity changes during the development process, the selection of development gates can be revised. Factors other than the project complexity index can also be used to select development gates.

Analysis of historical project data can also identify factors that determine a project's health as the project proceeds through the development process. A project's health determines the optimal amount of governance required for the project, as more governance is required to improve a project with poor health. A project governance index is created for a project by analyzing the project's health factors. Based on the project governance index, selections of development gates can be revised for the project.

The project governance index can also be applied to the project to select the optimal governance actions that occur at development gates and possibly between development gates. For example, when a project's health is poor, more reporting actions can be required to inform project managers about the project's poor development. Analysis of project complexity and project health can predict the optimal amount of governance required for each project, and revise the amount of governance required as the project's complexity and health change during the development process.

Figure 1:
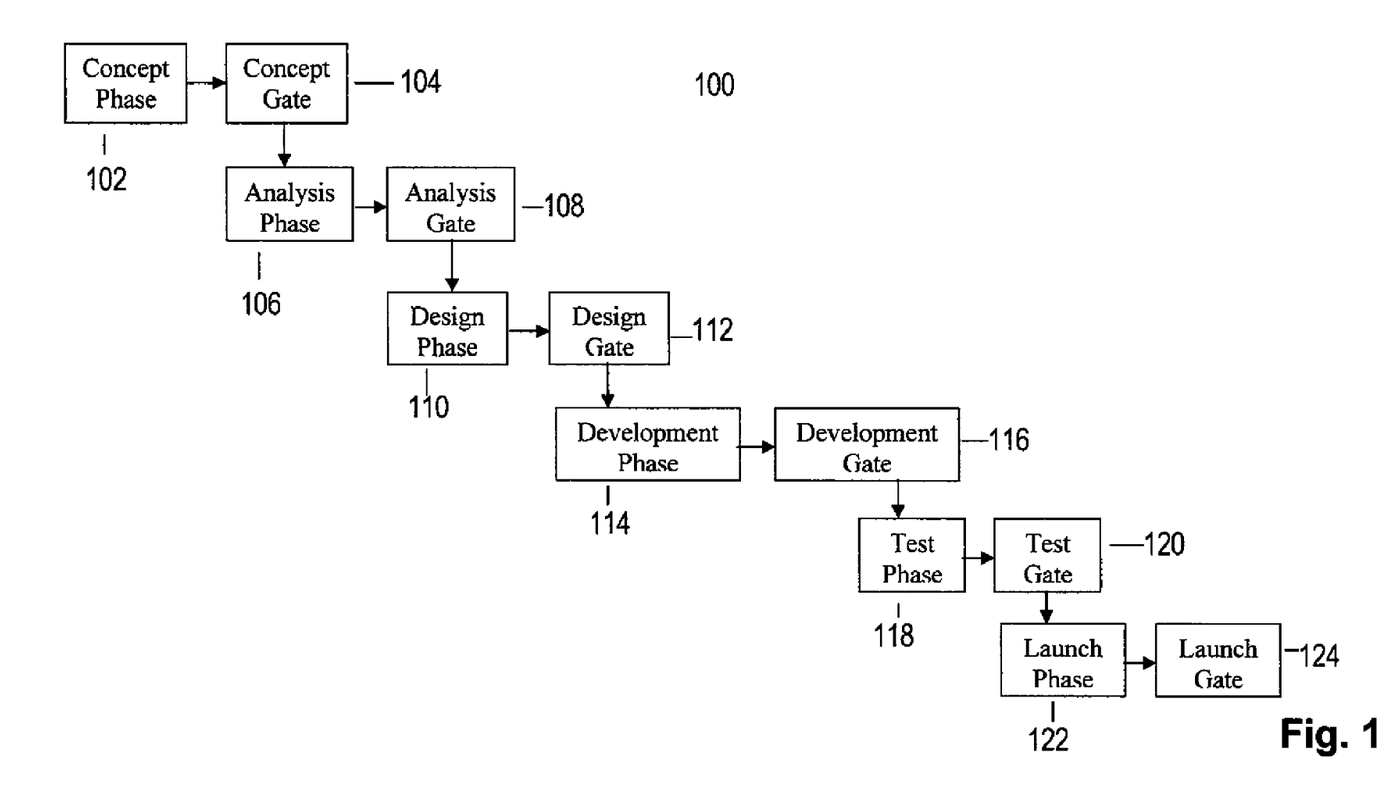
FIG. 1 shows a block diagram of a project development process according to some embodiments of the present disclosure.

In FIG. 1, a block diagram 100 of a project development process is depicted according to some embodiments of the present disclosure. The diagram 100 depicts a concept phase 102, a concept gate 104, an analysis phase 106, an analysis gate 108, a design phase 110, a design gate 112, a development phase 114, a development gate 116, a test phase 118, a test gate 120, a launch phase 122, and a launch gate 124. These phases and gates are depicted for the purpose of an illustrative example only, as the development process may include any number of phases and gates. For example, a general definition of a development process includes a conceptual phase, a planning phase, a definition and design phase, an implementation phase, and a conversion phase. Different types of projects that employ a development process can include engineering projects, manufacturing projects, computer programming projects, and construction projects. For example, the development process for an engineering project can include a start-up phase, a definition phase, a main phase, and a termination phase. Examples of different project phases for different types of projects can be found in Kerzner, Harold, *Project Management: A Systems Approach to Planning, Scheduling, and Controlling*. New York, N.Y., John Wiley & Sons, 2001, 7$^{th}$ Edition. p. 83. HD69.P75 K47 2000.

Project information is reviewed at each gate to determine whether development of the corresponding project is ready to proceed to the next phase. For example, following development of the project during the analysis phase 106, the project information is reviewed at the analysis gate 108 to determine whether development of the corresponding project is ready to proceed to the design phase 110. If the corresponding project is not ready for the design phase 110, actions are taken at the analysis gate 108 to prepare the project to be developed in the design phase 110. In some embodiments of the present disclosure, the project development pipeline may be a software development pipeline. For example, the concept phase 102 may be a software requirements analysis and software specification phase that is subdivided into a feasibility phase and an estimation phase, and the launch phase 122 may be a software training and support phase.

Figure 2:
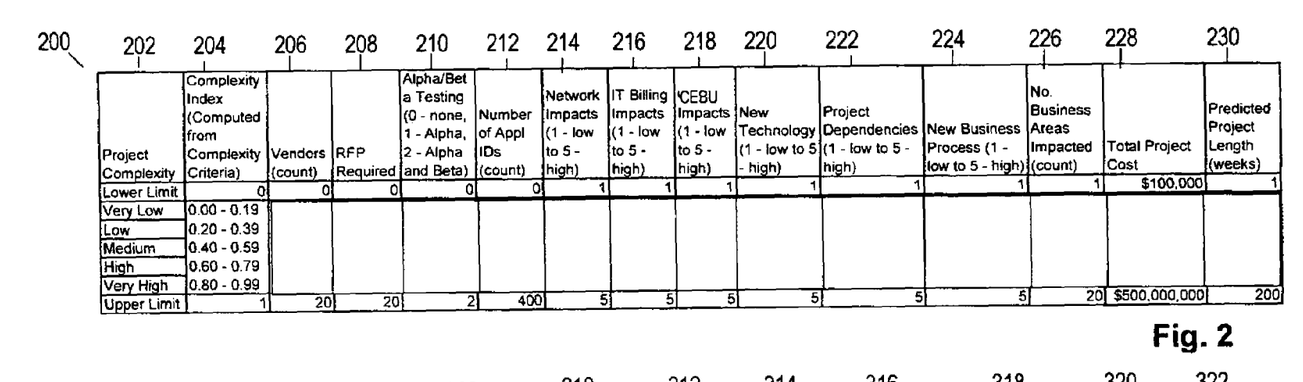
FIG. 2 shows a table of project complexity factors for flexible project governance based on predictive analysis according to some embodiments of the present disclosure.

Turning now to FIG. 2, a table 200 of project complexity factors used for flexible project governance based on predictive analysis is depicted according to some embodiments of the present disclosure. Each individual project complexity factor associated with a project is analyzed to generate corresponding project complexity index attributes. The project complexity index attributes are combined to generate a project complexity index for the project. The development gates for the project are selected based on the generated project complexity index. The table 200 includes a project complexity 202 column, a complexity index 204 column, a vendors 206 column, a requests for proposals required 208 column, an alpha/beta testing 210 column, a number of application identifiers 212 column, a network impacts 214 column, an information technology billing impacts 216 column, a customer equipment business unit impacts 218 column, a new technology 220 column, a project dependencies 222 column, a new business process 224 column, a number of business areas impacted 226 column, a total project cost 228 column, and a projected project length 230 column. These project complexity factors are depicted for the purpose of an illustrative example only, as the table 200 may include any number and type of project complexity factors.

Historical data is analyzed to set the lower limit and the upper limit and calibrate the scaling to generate a predictive project complexity index. Based on statistical analysis of historical data, the project complexity factors used to generate the project complexity index can be revised. For example, if the correlation between the number of vendors for a project and the eventual complexity of the project becomes zero, then the number of vendors can be eliminated from the process for generating the project complexity index.

Attributes used to generate the project complexity index are key elements associated with determining the complexity of a project. These attributes can be identified using a number of different techniques. One method is to employ statistical analysis using historical data. This approach consists of gathering historical data regarding a number of characteristics known to make a project more difficult to complete. The characteristics or attributes are viewed as independent variables associated with project complexity as part of a statistical analysis. Cycle time can be used to relate these attributes to project complexity. Statistical analysis is performed using a multiple regression analysis method such as step-wise regression or backward elimination regression to reduce the overall set of attributes to those which are statistically significant. These statistically significant attributes are used as the attributes in the model supporting the project complexity index. Details on multiple regression analysis can be found in Berenson, M. L, Krehbiel, T. C., and Levine, D. M., *Basic Business Statistics: Concepts and Applications*. Upper Saddle River, N.J., Pearson/Prentice Hall, 2005, 8$^{th}$ Edition. p. 550-633. HF1017.B38 2001.

Each column in the table 200 includes data that ranges from a lower limit to an upper limit. For example, the project complexity 202 ranges from a lower limit, through project complexities that are very low, low, medium, high, and very high to the upper limit for project complexity. In another example, the complexity index 204 column includes data that ranges from a lower limit of 0 to an upper limit of 1, with intermediate ranges such as 0.20 to 0.39 for the low project complexity 202 and 0.60 to 0.79 for the high project complexity 202. Each column includes a lower limit that is equated with very low project complexity and an upper limit that is equated with very high project complexity. Although lower limits and upper limits are depicted for columns 206 to 230, intermediate ranges are not depicted for these columns because the scale for the data ranges may not be linear. For example, the total project cost 228 column ranges from a lower limit of $100,000 to an upper limit of $500,000,000. If the data range in the total project cost column 228 was linear, then the data for medium project complexity 202 would be approximately $200,000,000 to $300,000,000. However, using such a linear data range could result in determining the total project cost to correspond to the very low project complexity 202 for almost every project. Therefore, non-linear scales can be used for the columns 206 to 230 so that analyzing a data range that includes an upper limit based on a few uncharacteristic instances does not generate a skewed project complexity index attribute.

The vendors 206 column includes data that ranges from 0 to 20, where 20 vendors for a project generate a project complexity attribute that corresponds to the very high project complexity 202. The requests for proposals required 208 column includes data that ranges from 0 to 20, where 20 requests for proposals required for a project generate a project complexity attribute that corresponds to the very high project complexity 202. The alpha/beta testing 210 column includes data that ranges from 0 to 2, where the data 2 corresponds to beta testing for a project, which generates a project complexity attribute that corresponds to the very high project complexity 202. The number of application identifiers 212 column includes data that ranges from 0 to 400, where 400 applications impacted for a project generate a project complexity attribute that corresponds to the very high project complexity 202.

Some project complexity factors are analyzed based on subjective ratings, such as a low rating of 1 to a high rating of 5. The project complexity factors for columns 214 to 224 include data that ranges from 1 to 5, where a rating of 5 for a project generates a project complexity attribute that corresponds to the very high project complexity 202. The number of business areas impacted 226 column includes data that ranges from 1 to 20, where 20 business areas impacted for a project generate a project complexity attribute that corresponds to the very high project complexity 202. The projected project length 230 column includes data that ranges from 1 week to 200 weeks, where 200 weeks for a project generate a project complexity attribute that corresponds to the very high project complexity 202.

Figure 3:
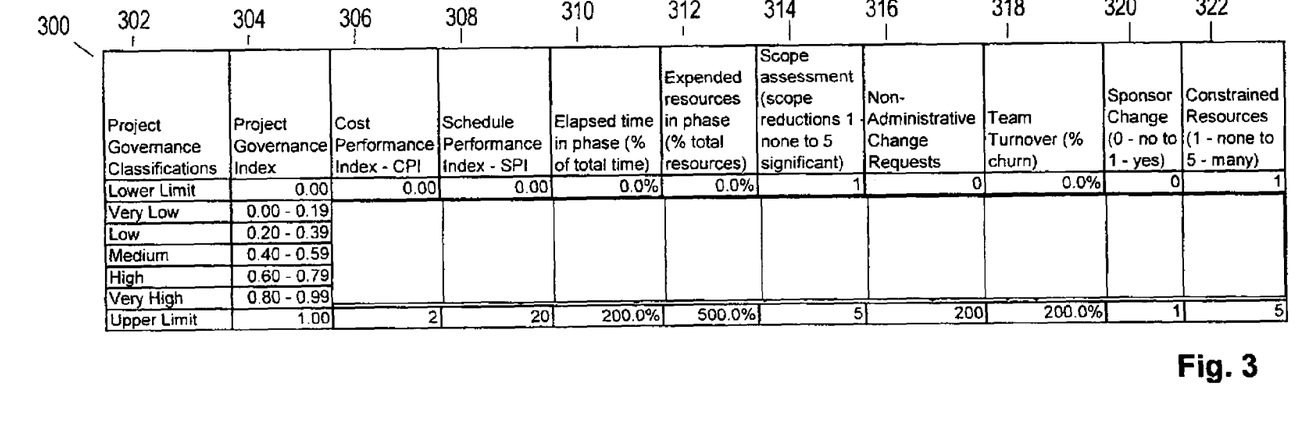
FIG. 3 shows a table of project governance factors for flexible project governance based on predictive analysis according to some embodiments of the present disclosure.

Turning now to FIG. 3, a table 300 of project governance factors for flexible project governance based on predictive analysis is depicted according to some embodiments of the present disclosure. Each project governance factor tracks at least one aspect of the health of a project. Each individual project governance factor associated with a project is analyzed to generate corresponding project governance index attributes. The corresponding project governance index attributes are combined to generate a project governance index for the project. Based on the generated project complexity index, actions for project reporting and for the development gates for the project are selected. The table 300 includes a project governance classifications 302 column, a project governance index 304, a cost performance index 306 column, a schedule performance index 308 column, an elapsed time in phase 310 column, an expended resources in phase 312 column, a scope assessment 314 column, a non-administrative change requests 316 column, a team turnover 318 column, a sponsor change 320 column, and a constrained resources 322 column. These project governance factors are depicted for the purpose of an illustrative example only, as the table 300 may include any number and type of project governance factors.

Historical data is analyzed to set the lower limit and the upper limit and calibrate the scaling to insure that when analyzed the project governance factors generate a predictive project governance index. Based on statistical analysis of historical data the project governance factors that are used to generate the project governance index can be revised. For example, if the correlation between the sponsor change factor for a project and the eventual required governance of the project becomes zero, then the sponsor change factor is eliminated from the process for generating the project governance index.

Each column in the table 300 includes data that ranges from a lower limit to an upper limit. For example, the project governance classifications 302 ranges from a lower limit, through project governance classifications that are very low, low, medium, high, and very high to the upper limit for project complexity. In another example, the project governance index 304 column includes data that ranges from a lower limit of 0 to an upper limit of 1, with intermediate ranges such as 0.20 to 0.39 for the low project governance classifications 202 and 0.60 to 0.79 for the high project governance classifications 302. Each column includes a lower limit that is equated with the very low project governance classification 302 and an upper limit that is equated with the very high project governance classification 302. Although lower limits and upper limits are depicted for columns 306 to 322, intermediate ranges are not depicted for these columns because the scale for the data ranges may not be linear, due to the same types of reasons for using non-linear scales for the data in columns 206 to 230.

The cost performance index 306 column includes data that ranges from 0 to 2, where a rating of 2 for a project generates a project governance attribute that corresponds to the very high project governance classifications 302. The schedule performance index 308 column includes data that ranges from 0 to 20, where a rating of 20 for a project generates a project governance attribute that corresponds to the very high project governance classifications 302. The elapsed time in phase 310 column includes data that ranges from 0% to 200%, where 200% of the elapsed time in phase for a project generates a project governance attribute that corresponds to the very high project governance classifications 302. The expended resources in phase 312 column includes data that ranges from 0% to 500%, where 500% of the expended resources in phase for a project generates a project governance attribute that corresponds to the very high project governance classifications 302. The scope assessment 314 column includes data that ranges from 1 to 5, where a rating of 5 for a project generate a project governance attribute that corresponds to the very high project governance classifications 302. The non-administrative change requests 316 column includes data that ranges from 0 to 200, where 200 non-administrative change requests for a project generate a project governance attribute that corresponds to the very high project governance classifications 302. The team turnover 318 column includes data that ranges from 0% to 200%, where 200% team turnover for a project generates a project governance attribute that corresponds to the very high project governance classifications 302. The sponsor change 320 column includes data that ranges from 0 to 1, where 1 indicates a sponsor change for a project, which generates a project governance attribute that corresponds to the very high project governance classifications 302. The constrained resources 322 column includes data that ranges from 1 to 5, where a rating of 5 for a project generates a project governance attribute that corresponds to the very high project governance classifications 302.

Figure 4:
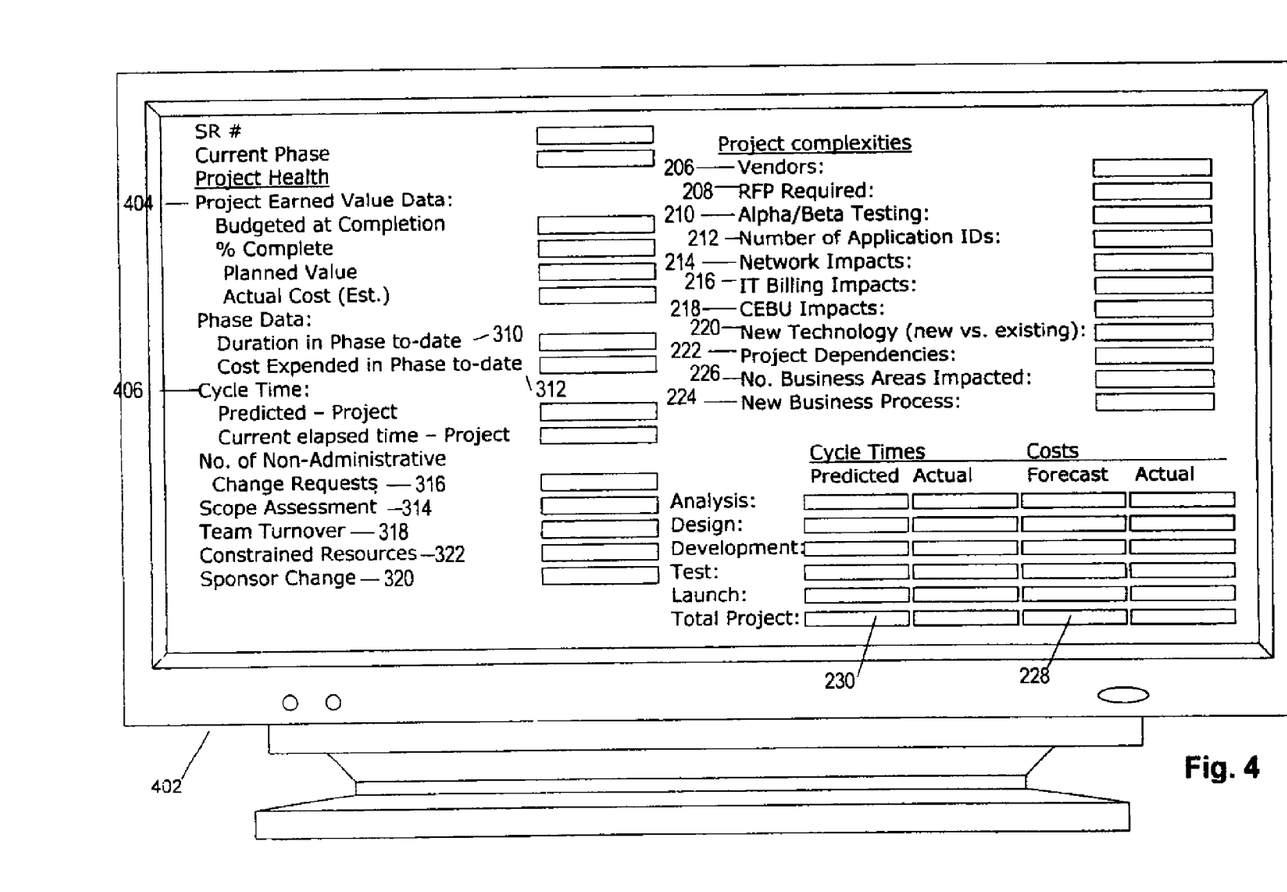
FIG. 4 shows a user interface for flexible project governance based on predictive analysis according to some embodiments of the present disclosure.

Turning now to FIG. 4, a user interface 402 for flexible project governance based on predictive analysis is depicted according to some embodiments of the present disclosure. The user interface 402 enables a user to enter data for project complexity factors and project governance factors. For example, data for columns 206 to 230 in FIG. 2 and data for columns 310 to 322 in FIG. 3 can be entered in the user interface 402, as depicted in FIG. 4. The user interface 402 can also display data for project complexity factors and project governance factors, selected development gates, selected actions for project reporting, and selected actions for development gates. Additionally, the user interface 402 includes fields to enter data for project earned value data 404 and cycle time 406. The project earned value data 404 is analyzed to generate data for the cost performance index 306 column and the cycle time 406 is analyzed to generate data for the schedule performance index 308 column. Details on earned value analysis can be found in the Project Management Institute's *A Guide to the Project Management Body of Knowledge. Newtown Square, Pa., USA: Project Management Institute, c2000, 3$^{rd}$ Edition.* p. 172-176. HD69.P75 G845 2000.

Figure 5:
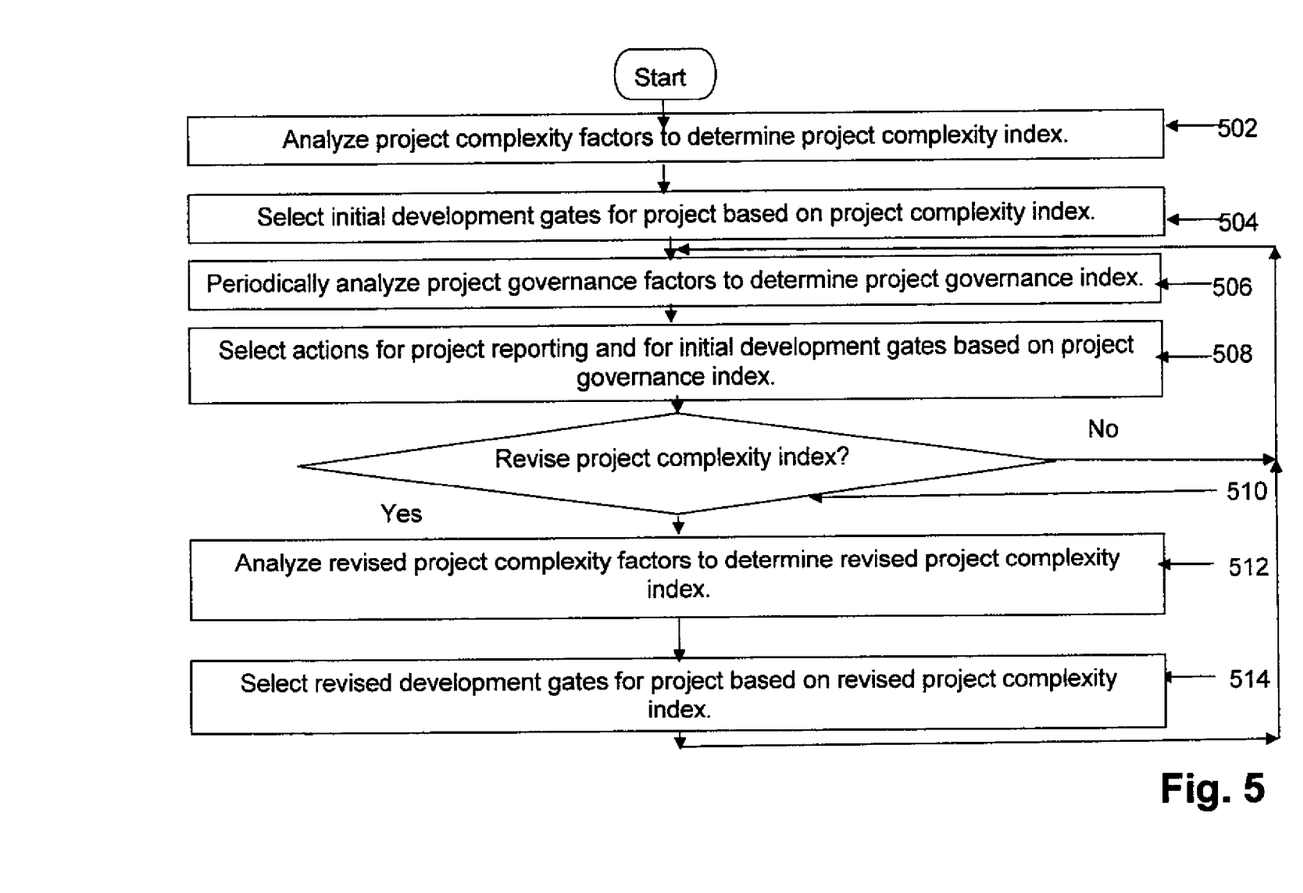
FIG. 5 shows a method for flexible project governance based on predictive analysis according to some embodiments of the present disclosure.

Turning now to FIG. 5, a method for flexible project governance based on predictive analysis is depicted according to some embodiments of the present disclosure. Executing the method, which can be implemented by a development gate selection tool, enables the selection of the optimal gates for a project and the selection of the appropriate actions for project reporting and for the selected optimal gates.

In box 502, project complexity factors are analyzed to determine a project complexity index. For example, the flexible project governance tool applies a Technique for Order Preference by Similarity to Ideal Solution (TOPSIS) to project complexity factors to determine the project complexity index. Details on TOPSIS can be found in Hwang, C. L. and Yoon, K. *Multiple Attribute Decision Making: Methods and Applications a state-of-the-art survey*. Berlin; New York: Springer-Verlag, 1981. T57.95.H85. The traditional TOPSIS method measures the Euclidian distance from the positive and negative ideal solutions to generate a relative index. In embodiments of the present disclosure, the applies the TOPSIS method to project complexity factors with upper and lower limits as substitutes for the positive and negative ideal solutions to force the generation of an absolute project complexity index. The flexible project governance tool can scale each project complexity factor, such as when the data range for a project complexity factor is based on a non-linear scale. The flexible project governance tool can multiply each project complexity factor by a corresponding weight, and combine each weighted project complexity factor to generate the project complexity index. Periodically, the flexible project governance tool can revise the corresponding scale for each project complexity factor and revise the corresponding weight for each project complexity factor based on statistical analysis of historical data.

In box 504, initial development gates are selected for the project based on the project complexity index. For example, the flexible project governance tool selects the concept gate 102, the design gate 110, and the launch gate 122 for the project based on the very low project complexity index 202. In another example, the flexible project governance tool selects the concept gate 102, the analysis gate 106, the design gate 110, the development gate 114, the test gate 118, and the launch gate 122 for the project based on the very high project complexity index 202. In yet another example, the flexible project governance tool selects the concept gate 102, the design gate 110, the test gate 118, and the launch gate 122 for the project based on the low project complexity index 202.

The development of the project is governed using the selected development gates. For example, the project with the very low project complexity index 202 is governed by the concept gate 102, the design gate 110, and the launch gate 122 because historical data indicates that projects with the very low project complexity index 202 are sufficiently governed by selecting and implementing these gates. Continuing this example, although the project with the very low project complexity index 202 can still complete the analysis phase 106, the development phase 114, and the test phase 118, the project is not governed by the analysis gate 108, the development gate 116, or the test gate 120. This lack of governance by non-selected gates is because historical data indicates that governing with these non-selected gates creates bureaucracy and unnecessary delays for projects with the very low project complexity index 202.

Additionally, variables can be identified as independent factors that dictate the selection of specified development gates. Independent factors are those that dictate the selection of development gates independent of the complexity index 202. In the area of project development, if a project required alpha/beta testing, selection of the test gate 120 is required. For example, if a vendor is to be engaged in the development process, the selection of the analysis gate 108 is required for identifying the vendors being considered and for evaluating the vendors prior to selection of the vendor, independent of the complexity index 202. If the project health is good at the end of the analysis phase 106, as indicated by the project governance index, a full governance review at the analysis gate 108 may not be necessary.

In box 506, project governance factors are periodically analyzed to determine a project governance index. Because the project governance factors track the health of the project, projects with better health have a lower project governance index, while projects with worse health have a higher project governance index. For example, the flexible project governance tool applies TOPSIS on a monthly basis to project governance factors to determine the project governance index. In embodiments of the present disclosure, the flexible project governance tool applies the TOPSIS method to project governance factors with upper and lower limits as substitutes for the positive and negative ideal solutions to force the generation of an absolute project governance index. The flexible project governance tool can scale each project governance factor, such as when the data range for a project governance factor is based on a non-linear scale. The flexible project governance tool can multiply each project governance factor by a corresponding weight, and combine each weighted project governance factor to generate the project governance index. Periodically, the flexible project governance tool can revise the corresponding scale for each project governance factor and revise the corresponding weight for each project governance factor based on statistical analysis of historical data.

The factors used to determine the project governance index are of a different nature than the factors used to determine the project complexity index. Project governance factors are those that address project health issues. One standard approach to measuring project health relating to earned value is based on the Project Management Institute's *A Guide to the Project Management Body of Knowledge (PMBOK® Guide)*. Newtown Square, Pa.: Project Management Institute, Inc., c2004, 3$^{rd}$ Edition. HD69.P75 G845 2004. This approach addresses the cost performance index (CPI) and schedule performance index (SPI) factors which might be included in project management processes. Project health issues also include time elapsed in phases, which provides phase level assessments associated with the overall project CPI and SPI earned value measurements. The amount of change from the original project scope or project groups creates additional potential for project health problems. This can include areas such as scope changes, team changes, sponsor changes, and change requests. Additionally, projects with highly constrained resources may require additional project governance to maintain good project health.

In box 508, actions for project reporting and for initial development gates are selected based on the project governance index. Fewer actions are selected for projects with better health, represented by a lower project governance index, because projects with better health need less governance. Likewise, more actions are selected for projects with worse health, represented by a higher project governance index, because projects with worse health need more governance to improve the project health. For example, the flexible project governance tool selects an interim gate review based on a high project governance index 304. The interim gate review can require the manager of the project to review concepts, performance, and requests for continuation of funds before the project completes its current phase and enters the next gate for review. If the project governance index 304 is very high, the project manager can be required to immediately conduct a complete gate review even though the project is currently in a phase and not at a gate. In contrast, the flexible project governance tool can select no action for a project with a low project governance index 304.

Additionally, the flexible project governance tool can select an alert only, a manager review, or a director review for a project with a medium project governance index 304, depending upon the specific project governance index 304. An alert only results in sending an alert message to the project manager. A manager review results in a requirement for the project manager to generate a review of the project and report the review to his director. A manager review results in a requirement for the director to report the review of the project to the superior for the director. Furthermore, the flexible project governance tool can select actions for the development gates based on the project governance index. For example, the flexible project governance tool can select for a light gate review, or a less detailed gate review, to be conducted by the manager of a project with a low project governance index 304 when the project reaches the next gate.

In box 510, whether to revise the project complexity index is determined. For example, the flexible project governance tool can determine on a monthly basis whether to revise the project complexity index. If the flexible project governance tool determines to revise the project complexity index, the method continues to box 512. If the flexible project governance tool determines not to revise the project complexity index, the method returns to box 506.

In box 512, revised project complexity factors are analyzed to determine a revised project complexity index. For example, each month the flexible project governance tool analyzes revised project complexity factors to determine a revised project complexity index. If the user of the flexible project governance tool revises the data for the project complexity factors, the flexible project governance tool revises the project complexity index. For example, if the number of vendors increases, the number of applications impacted increases, and the total project cost also increases, then the revised project complexity index increases relative to the previously generated project complexity index.

In box 514, revised development gates for the project are selected based on the revised project complexity index. For example, the flexible project governance tool selects the test gate 120 as an additional development gate for the project because the revised project complexity index is low, whereas the previously generated project complexity index was very low.

The flexible governance model can be generalized to other project development processes. For example, building a house could use a flexible governance process. For this example, constructing a house can include a concept phase, an analysis phase, a design phase, a development phase, a test phase and a launch phase, phases which are used as governance review points. The concept phase involves engaging an architect to formulate a concept for a house. The homeowners review the concept development at the concept governance review. In the analysis phase, the builder analyzes the lot, construction costs and other requirements to build the house. Once this analysis had been completed, the homebuilder and the homeowner review the analysis and costs, and determine if they would like to proceed at the analysis governance review. Next a detail design is developed to document the design of the house. This contains the detail necessary for the contractors and/or sub-contractors to complete the house. This constitutes the design phase and the design phase governance review. The house is built, or developed, by with responsible entities. The completion of the development is reviewed in a development governance review. After the house was built, an inspector tests the various components, i.e., electrical, plumbing, heating and cooling, etc. of the house and the developer and homeowner review the results. Once any necessary repairs are made, the home is cleared for occupation, which constitutes the test phase and the test governance review. In the launch phase, the homeowners move into the house. Typically, there is a warranty period where the homeowner can report problems with the house and the builder fixes the problems. Once the warranty period is over, the final review which is the launch governance review, releases the builder from any additional responsibilities associated with the house construction.

In the context of the flexible governance model, a set of decision criteria can be used to determine which governance reviews are initially needed for the house building process. These might include, set building plans for a housing development, a new builder, pre-determined costs and specifications for the house, set contractors used in building, etc. A project complexity index can be calculated and used to select which review points are required for the homeowner and builder's review. If the house concept is brand new and expensive, then all governance reviews might be necessary.

In the ongoing governance, a project governance index can be used to determine the frequency of the governance reviews based on the progress and condition of the development effort. For example, the project governance index may be calculated using schedule performance, costs performance, sub-contractor performance, etc. If the project governance index indicated this as the case, additional governance reviews might be required in the project.

Figure 6:
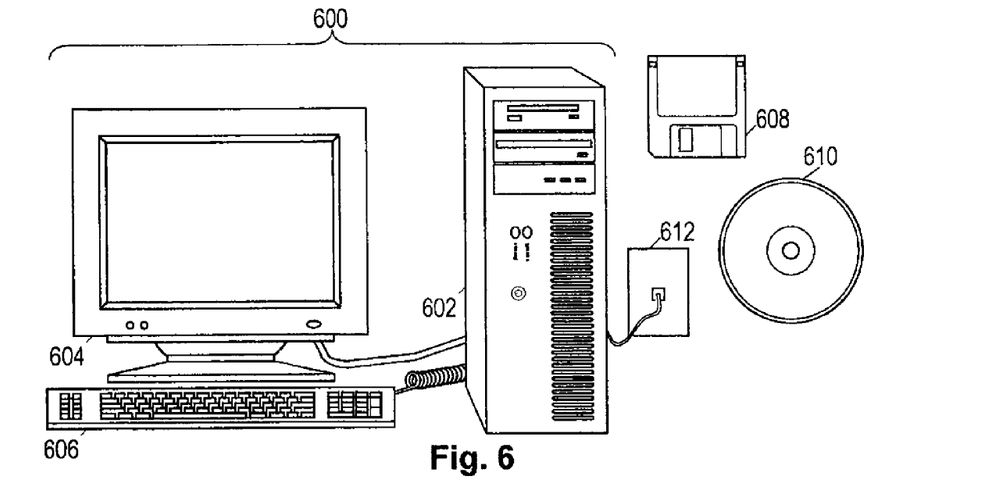
FIG. 6 shows an illustrative flexible project governance tool embodied as a desktop computer.

FIG. 6 shows an illustrative system 600 for a flexible project governance tool. The system 600 is shown as a desktop computer 600, although any electronic device having some amount of computing power coupled to a user interface may be configured to carry out the methods disclosed herein. Among other things, servers, portable computers, personal digital assistants (PDAs) and mobile phones may be configured to carry out aspects of the disclosed management tool methods.

As shown, the system 600 comprises a chassis 602, a display 604, and an input device 606. The chassis 602 comprises a processor, memory, and information storage devices. One or more of the information storage devices may store programs and data on removable storage media such as a floppy disk 608 or an optical disc 610. The chassis 602 may further comprise a network interface that allows the system 600 to receive information via a wired or wireless network, represented in FIG. 6 by a phone jack 612. The information storage media and information transport media (i.e., the networks) are collectively called "information carrier media."

The chassis 602 is coupled to the display 604 and the input device 606 to interact with a user of the pipeline management system. The display 604 and the input device 606 may together operate as a user interface, such as the user interface 402. The display 604 is shown as a video monitor, but may take many alternative forms such as a printer, a speaker, or other means for communicating information to a user, information such as factory representations, solutions to problems, throughput equations, and project information. The input device 606 is shown as a keyboard, but may similarly take many alternative forms such as a button, a mouse, a keypad, a dial, a motion sensor, a camera, a microphone or other means for receiving information from a user, information such as project complexity factors and project governance factors. Both the display 604 and the input device 606 may be integrated into the chassis 602.

Figure 7:
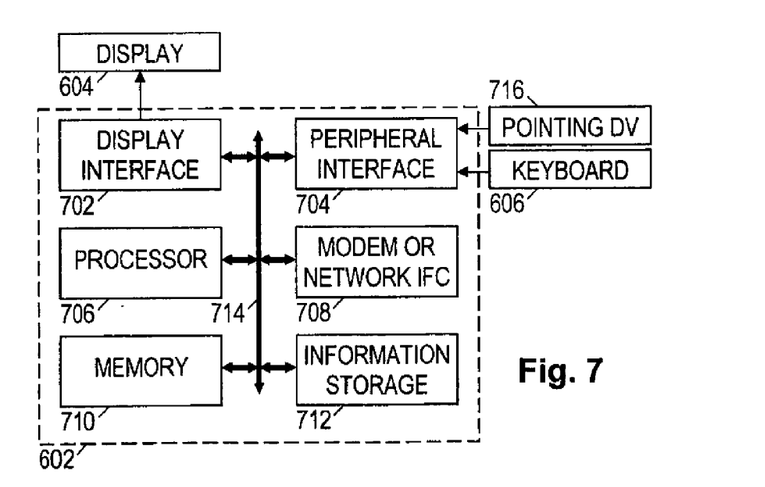
FIG. 7 shows a block diagram of an illustrative flexible project governance system.

FIG. 7 shows a simplified functional block diagram of the system 600. The chassis 602 may comprise a display interface 702, a peripheral interface 704, a processor 706, a modem or other suitable network interface 708, a memory 710, an information storage device 712, and a bus 714. The system 600 may be a bus-based computer, with the bus 714 interconnecting the other elements and carrying communications between them. The display interface 702 may take the form of a video card or other suitable display interface that accepts information from the bus 714 and transforms it into a form suitable for the display 604, which can be part of the user interface 402. Conversely, the peripheral interface 704 may accept signals from the keyboard 606, which can be associated with the user interface 402, and other input devices such as a pointing device 716, and transform them into a form suitable for communication on the bus 714. Such signals may include project complexity factors and project governance factors.

The processor 706 gathers information from other system elements, including input data from the peripheral interface 704, and program instructions and other data from the memory 710, the information storage device 712, or from a remote location via the network interface 708. The processor 706 carries out the program instructions and processes the data accordingly. The program instructions may further configure the processor 706 to send data to other system elements, comprising information for the user which may be communicated via the display interface 702 and the display 604, information such as project complexity factors, project governance factors, selected development gates, and selected actions.

The network interface 708 enables the processor 706 to communicate with remote systems via a network. The memory 710 may serve as a low-latency temporary store of information for the processor 706, and the information storage device 712 may serve as a long term (but higher latency) store of information.

The processor 706, and hence the desktop computer 600 as a whole, operates in accordance with one or more programs stored on the information storage device 712. The processor 706 may copy portions of the programs into the memory 710 for faster access, and may switch between programs or carry out additional programs in response to user actuation of the input device. The additional programs may be retrieved from the information storage device 712 or may be retrieved from remote locations via the network interface 708. The programs may be in the form of computer readable program code. One or more of these programs configures the system 600 to execute a data analysis routine to carry out at least one of the development gate selection methods disclosed herein.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer implemented method for flexible project governance based on predictive analysis, comprising:
analyzing, by a development gate selection tool executing on a processor, project complexity factors of a project to calculate a project complexity index for the project, the project complexity factors are factors that are determinative of the project's complexity;
selecting, by the development gate selection tool, an initial set of development gates for the project out of a set of possible development gates based on the project complexity index of the project, wherein each development gate is part of a project pipeline where development of the project during a preceding phase is evaluated to determine whether development of the project is ready to proceed to the next phase;
periodically analyzing, by the development gate selection tool, project governance factors of the project during the project pipeline to calculate a project governance index for the project, the project governance factors are factors that are determinative of the project's health as the project proceeds through the project pipeline; and
revising, by the development gate selection tool, the initial set of development gates selected for the project based on the project governance index.

2. The computer implemented method of claim 1 further comprising:
periodically analyzing revised project complexity factors to calculate a revised project complexity index; and
selecting revised development gates for the project based on the revised project complexity index.

3. The computer implemented method of claim 1, wherein calculating a project complexity index or project governance index comprises applying a technique for order preference by similarity to ideal solution to project complexity factors or project governance factors, respectively, with upper and lower limits, wherein attributes based on each project complexity factor or project governance factor, respectively, are normalized and weighted.

4. The computer implemented method of claim 1, wherein calculating the project complexity index comprises scaling each project complexity factor by a corresponding scale, multiplying each scaled project complexity factor by a corresponding weight, and combining each weighted scaled project complexity factor.

5. The computer implemented method of claim 1, wherein calculating the project governance index comprises scaling each project governance factor by a corresponding scale, multiplying each scaled project governance factor by a corresponding weight, and combining each weighted scaled project governance factor.

6. The computer implemented method of claim 4, further comprising revising the corresponding scale for each project complexity factor and revising the corresponding weight for each project complexity factor based on statistical analysis of historical data.

7. The computer implemented method of claim 5, further comprising revising the corresponding scale for each project governance factor and revising the corresponding weight for each project governance factor based on statistical analysis of historical data.

8. The computer implemented method of claim 1, further comprising revising the project complexity factors that are determinative of a project's complexity based on statistical analysis of historical data.

9. The computer implemented method of claim 1, further comprising revising the project governance factors that are determinative of a project's health based on statistical analysis of historical data.

10. The computer implemented method of claim 1, wherein each project comprises a concept phase, an analysis phase, a design phase, a development phase, a test phase, and a launch phase.

11. The computer implemented method of claim 10, wherein the initial development gates selected based on a low project complexity index comprise a concept gate, a design gate, and a launch gate.

12. The computer implemented method of claim 10, wherein the initial development gates selected based on a high project complexity index comprise a concept gate, an analysis gate, a design gate, a development gate, a test gate, and a launch gate.

13. The computer implemented method of claim 1, further comprising selecting, by the development gate selection tool, actions for project reporting and actions for the initial development gates based on the project governance index.

14. The computer implemented method of claim 13, wherein the actions are selected from the group of actions consisting of: no action, alert only, manager review, director review, vice president review, interim gate review, and gate review.

15. The computer implemented method of claim 1, wherein the project complexity factors include at least one project complexity factor selected from the group consisting of: a number of vendors, a number of requests for proposal required, a testing plan, a number of applications impacted, a network impact, an information technology billing impact, a customer business equipment unit impact, a new technology factor, a number of project dependencies, a new business process factor, a number of business areas impacted, a total project costs, and an estimated project length.

16. The computer implemented method of claim 1, wherein the project governance factors include at least one project governance factor selected from the group consisting of: a cost performance factor, a schedule performance factor, an elapsed time in phase, an expended resources in phase, a scope assessment factor, a number of non-administrative change requests, a team turnover factor, a sponsor change factor, and a constrained resources factor.

17. The computer implemented method of claim 1, wherein revising the initial set of development gates selected for the project comprises adding or removing one or more development gates from the initial set of development gates.

18. A computer implemented system for flexible project governance based on predictive analysis, comprising:
    a non-transitory computer readable medium comprising instructions of a data analysis routine that, when executed by a processor, is operable to:
        analyze project complexity factors of a project to calculate a project complexity index for the project, the project complexity factors are factors that are determinative of the project's complexity,
        select an initial set of development gates for the project out of a set of possible development gates based on the project complexity index of the project, wherein each development gate is part of a project pipeline where development of the project during a preceding phase is evaluated to determine whether development of the project is ready to proceed to the next phase,
        periodically analyze project governance factors of the project during the project pipeline to calculate a project governance index for the project, the project governance factors are factors that are determinative of the project's health as the project proceeds through the project pipeline, and
        revise the initial set of development gates selected for the project based on the project governance index; and
    a non-transitory computer readable medium comprising instructions of a user interface that, when executed by a processor, is operable to display selections of the initial development gates.

19. The computer implemented system of claim 18 wherein the data analysis routine, when executed by a processor, is further operable to:
    periodically analyze revised project complexity factors to calculate a revised project complexity index, and to select revised development gates for the project based on the revised project complexity index; and
    wherein the user interface, when executed by a processor is further operable to:
        display selections of the revised development gates for the project based on the revised project complexity index.

20. The computer implemented system of claim 18 wherein the user interface, when executed by a processor, is further operable to receive values for the project complexity factors and the project governance factors.

* * * * *